US012698952B2

(12) United States Patent
Persson et al.

(10) Patent No.: US 12,698,952 B2
(45) Date of Patent: Aug. 4, 2026

(54) EMBEDDED TARGET TRACKING TRAINING

(71) Applicant: Bae Systems Hägglunds Aktiebolag, Örnsköldsvik (SE)

(72) Inventors: Johan Persson, Domsjö (SE); Karin Fossum Sjödin, Själevad (SE); Jerker Wågberg, Örnsköldsvik (SE)

(73) Assignee: Bae Systems Hägglunds Aktiebolag, Örnsköldsvik (SE)

( * ) Notice: Subject to any disclaimer, the term of this patent is extended or adjusted under 35 U.S.C. 154(b) by 942 days.

(21) Appl. No.: 17/796,591

(22) PCT Filed: Feb. 1, 2021

(86) PCT No.: PCT/SE2021/050074
§ 371 (c)(1),
(2) Date: Jul. 29, 2022

(87) PCT Pub. No.: WO2021/158159
PCT Pub. Date: Aug. 12, 2021

(65) Prior Publication Data
US 2023/0049613 A1 Feb. 16, 2023

(30) Foreign Application Priority Data
Feb. 3, 2020 (SE) .................................... 2050112-8

(51) Int. Cl.
*F41G 3/26* (2006.01)
*G09B 9/042* (2006.01)
*F41H 7/02* (2006.01)

(52) U.S. Cl.
CPC ........... *F41G 3/2694* (2013.01); *G09B 9/042* (2013.01); *F41H 7/02* (2013.01)

(58) Field of Classification Search
CPC . F41G 3/2694; F41G 3/22; F41G 3/26; F41G 5/00; G09B 9/042; F41H 7/02; F41A 33/00
(Continued)

(56) References Cited

U.S. PATENT DOCUMENTS 3,691,284 A 9/1972 Borjeson
4,521,196 A * 6/1985 Briard ................... F41G 3/2694
434/20
(Continued)

FOREIGN PATENT DOCUMENTS

CA 2266915 A1 10/1999
CN 104067160 A 9/2014
(Continued)

OTHER PUBLICATIONS

Partial European Search Report for European Application No. 21751073.4 mailed on Feb. 6, 2024, 19 pages.
(Continued)

*Primary Examiner* — Peter S Vasat
*Assistant Examiner* — Stephen Alvesteffer
(74) *Attorney, Agent, or Firm* — Morrison & Foerster LLP

(57) ABSTRACT

The present invention relates to a method for embedded combat vehicle gun target tracking training performed at an electronic device, an electronic device for performing the method and a computer readable storage medium storing one or more programs for performing the method. The method comprises determining a trajectory of a virtual target for a period of time; determining an aim point location of the weapon system; displaying, on a display device, a first and second graphical object overlaid onto an image sequence, wherein the first graphical object represents an aim point location of the weapon system and wherein the second (Continued)

graphical object represents a virtual target which moves along the determined trajectory. User inputs are received representative of control signals for causing weapon system movements and the second graphical object is updated based on the weapon system movements.

12 Claims, 7 Drawing Sheets

(58) Field of Classification Search
USPC .......................................................... 434/19
See application file for complete search history.

(56) References Cited

U.S. PATENT DOCUMENTS

| | | | | |
|---|---|---|---|---|
| 4,639,222 | A | 1/1987 | Vishlizky | |
| 5,347,910 | A * | 9/1994 | Avila .................... | F41G 7/2293 |
| | | | | 89/41.22 |
| 8,550,817 | B2 * | 10/2013 | Preston .................... | F41G 3/26 |
| | | | | 434/11 |
| 10,030,931 | B1 | 7/2018 | Black et al. | |
| 2003/0140774 | A1 | 7/2003 | Malakatas | |
| 2007/0287133 | A1 | 12/2007 | Schubert et al. | |
| 2011/0207089 | A1 | 8/2011 | Lagettie et al. | |
| 2012/0178053 | A1 | 7/2012 | D'Souza et al. | |
| 2013/0130204 | A1 * | 5/2013 | Lim ........................ | F41G 3/265 |
| | | | | 434/21 |
| 2017/0316711 | A1 | 11/2017 | Surdu et al. | |
| 2018/0356187 | A1 * | 12/2018 | Clermont .............. | G09B 9/003 |
| 2019/0137219 | A1 | 5/2019 | Bockmon et al. | |

FOREIGN PATENT DOCUMENTS

| | | | |
|---|---|---|---|
| CN | 106872978 | A | 6/2017 |
| CN | 109154486 | A | 1/2019 |
| CN | 109964188 | A | 7/2019 |
| DE | 19606685 | A1 | 7/1997 |
| GB | 2017276 | A | 3/1979 |
| KR | 1020140112811 | A | 9/2014 |
| KR | 10-2017-0083788 | | 7/2017 |
| RU | 2015153435 | A | 6/2017 |
| WO | WO-2012069294 | A2 | 5/2012 |
| WO | WO-2014060971 | A1 | 4/2014 |

OTHER PUBLICATIONS

Extended European Search Report for European Application No. 21751073.4 mailed on May 2, 2024, 18 pages.
International Search Report and Written Opinion for International Application No. PCT/SE2021/050074 mailed on Dec. 3, 2021, 11 pages.
Swedish Office Action and Search Report for Swedish Application No. SE2050112-8 mailed on Sep. 28, 2020, 9 pages.
PhilDaily "what could go wrong if I use my joystick/throttle/rudder pedals to drive a tank", retrieved from youtube.com under watch?v=B5qOYGhVL8A, uploaded Mar. 24, 2019.
Office Action and Search Report received for Chinese Patent Application No. 202180011628.X mailed on Sep. 1, 2023, 16 pages. English translation included.
Gong et al., (2012). "Training Simulation Platform of a Certain Type of Integrated Missile and Anti-Aircraft Gun Weapon System," Journal of Gun Launch & Control, 6:58-62. English abstract.
Zhao et al., (2010). "Research on Application of Embedded Simulation in Tank Shooting Training System," Computing Technology and Automation, 29(4):32-35. English abstract.

* cited by examiner

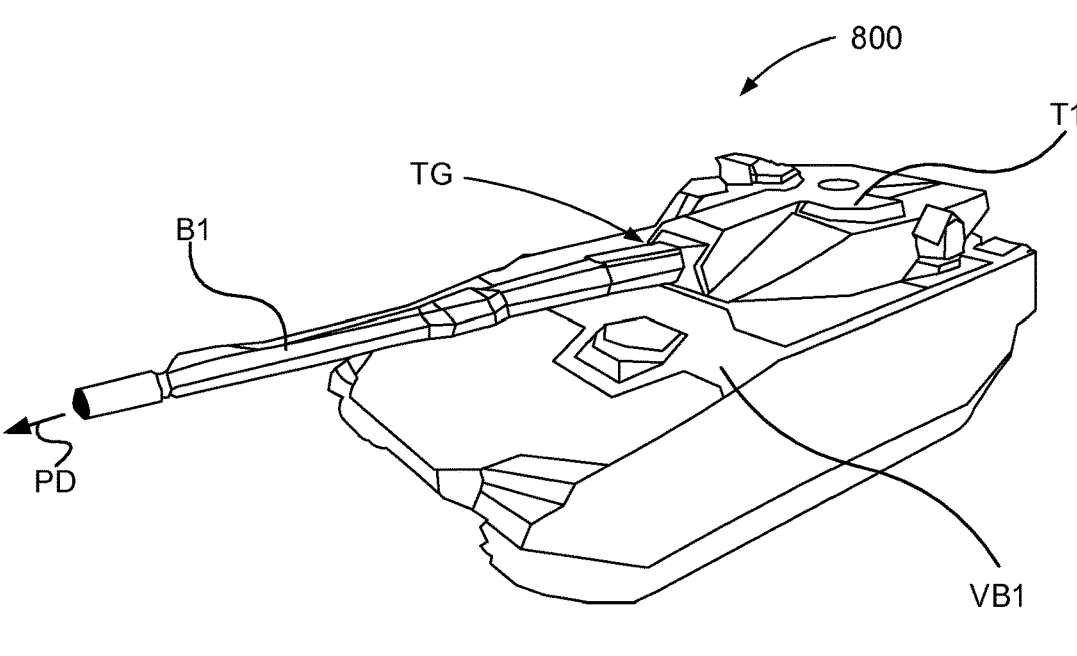
Fig. 2A
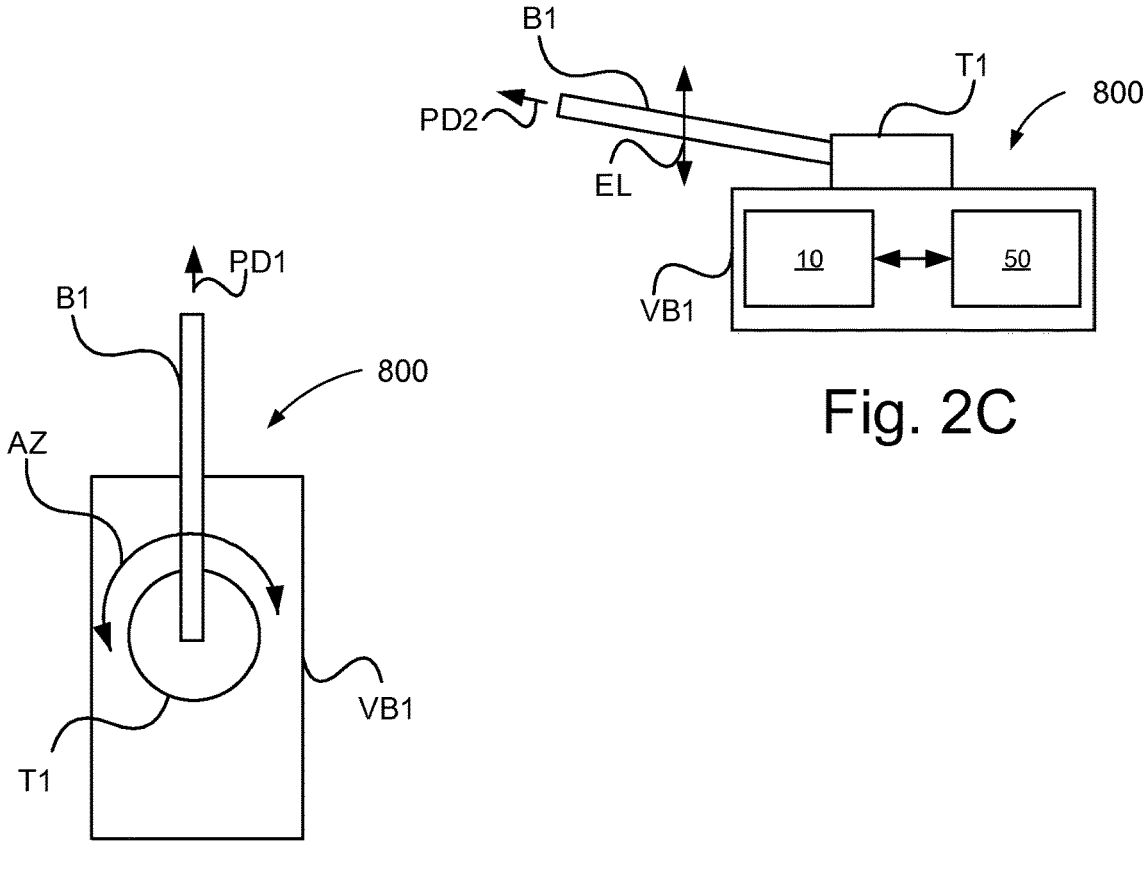
Fig. 2C
Fig. 2B

EMBEDDED TARGET TRACKING TRAINING

CROSS REFERENCE TO RELATED APPLICATIONS

This application is a national stage application under 35 U.S.C. § 371 of International Application No. PCT/SE2021/050074, filed internationally on Feb. 1, 2021, which claims priority to SE 2050112-8, filed Feb. 3, 2020, the entire contents of each are incorporated by reference herein.

TECHNICAL FIELD

The present invention relates to a method for embedded combat vehicle weapon system target tracking training according to the preamble of claim 1. The present invention also relates to an electronic device and a computer readable storage medium for performing the method.

BACKGROUND ART

Today there exist numerous examples of training systems for training of operators of various weapon system of combat vehicles such as armoured vehicles, tanks and infantry fighting vehicles.

One type of training system for training target tracking of a combat vehicle is based on using one or more physical target such as target cards or resettable target spots. However, such training systems requires space consuming external installations in a controlled training environment.

Another form of training systems are live training systems such as laser based training systems wherein vehicles are equipped with laser transmitters and receivers for enabling simulating firing events by means of the transmitters and detecting hit events by means of the receivers. While these type of training systems provide efficient means for training of crew members of a combat vehicle it is also costly since relatively complex equipment needs to be fitted onto multiple objects such as vehicles. Furthermore, in order to practise target tracking for moving target more than one vehicle needs to be included in the training whereby the training cost is relatively high due to fuel consumption and increased number of crew members.

Yet another form of training system are combat vehicle simulators wherein for example a desktop computer is used to simulate a vehicle, its weapon systems and targets in an environment around the vehicle. Such type of training systems can also be provided within a mock-up vehicle. However, while using a desktop computer can provide cost efficient training the degree of realism will be limited. Also, using a mock-up vehicle for training requires a complex and costly installation.

Thus, there exists a need to present improvement within training systems training target tracking for example to improve training of combat vehicle gunners.

OBJECTS OF THE INVENTION

An object of the present invention is to provide a more efficient method for combat vehicle gun target tracking training.

An additional object of the present invention is to provide method for combat vehicle gun target tracking training which is simple and cost effective.

An additional object of the present invention is to provide method for combat vehicle gun target tracking training with improved availability by avoiding requiring complex and costly training facilities.

SUMMARY OF THE INVENTION

These and other objects, apparent from the following description, are achieved by a method for embedded combat vehicle gun target tracking training, a computer readable storage medium and an electronic device, and an electronic device as set out in the appended independent claims. Preferred embodiments of the method are defined in appended dependent claims.

According to the invention, the objects are achieved by a method at a combat vehicle for embedded combat vehicle weapon system target tracking performed at the combat vehicle. The combat vehicle comprises an electronic device with a display device and input means. The method is performed at said electronic device with a display device and input means. The method comprises: determining a trajectory of a virtual target for a period of time; determining an aim point location of the weapon system of the combat vehicle based on a current pointing direction of the gun along an azimuth and an elevation direction. The method further comprises obtaining an image sequence of a sight camera associated with the weapon system of the combat vehicle; displaying, on the display device: said image sequence; a first graphical object, overlaid on the image sequence, wherein the first graphical object is representative of the aim point location and displayed on a first position on the display device to indicate the determined aim point location of the weapon system; and a second graphical object, overlaid on the image sequence, wherein the second graphical object is representative of the virtual target and displayed on a second position on the display device to indicate a starting position of the virtual target based on the determined trajectory over the period of time; while displaying the graphical objects on the display device: updating display of the second graphical objects by moving the second graphical object from the second position along the determined trajectory over the period of time; and receiving, via the input means, one or more user inputs representative of one or more control signals causing movement of the pointing direction of the weapon system along the azimuth and/or the elevation direction; in response to receiving the one or more user inputs updating display of the first graphical object by moving the first graphical object from the first position in accordance with the movement of the pointing direction of the gun caused by the one or more user inputs.

Hereby is achieved an efficient method for providing target tracking training to an operator of a weapon system (e.g., gunner operating a main gun) integrated in a vehicle, wherein training can be performed efficiently with a relatively high degree of realism and at a low cost since an actual combat vehicle can be used for the training, i.e. the training is embedded, without requiring any physical targets (e.g., other physical target installation external to the vehicle or other vehicle acting as targets). Thus, the crew (e.g., one or more members of a combat vehicle crew such as a gunner) can be situated inside the combat vehicle at their respective operation stations while performing training which provides an increased degree of realism. Furthermore, target tracking training can be performed while the combat vehicle remains stationary or while the combat vehicle moves.

According to an embodiment of the method, the method further comprises while the graphical objects are displayed:

determining, over the period of time, metrics associated to when the first graphical object is within a threshold distance of the second graphical object so as to enable to evaluate aiming accuracy (e.g., target tracking performance, such as target tracking performance over time or responsiveness).

According to the invention the objects are also achieved by an electronic device performing the method and by a computer readable medium storing one or more programs, the one or more programs comprising instructions, which when executed by an electronic device cause the device to perform the method.

BRIEF DESCRIPTION OF THE DRAWINGS

For a better understanding of the present invention reference is made to the following detailed description when read in conjunction with the accompanying drawings, wherein like reference characters refer to like parts throughout the several views, and in which:

FIG. 2A schematically illustrates a perspective view of an exemplary combat vehicle within which the electronic device, illustrated in FIG. 1A, can be embedded for provision of target tracking training according to an embodiment;

FIG. 2B schematically illustrates a top view of the exemplary combat vehicle illustrated in FIG. 2A;

FIG. 2C schematically illustrates a side view of the exemplary combat vehicle illustrated in FIGS. 2A and 2B;

DETAILED DESCRIPTION

Figure 1A:
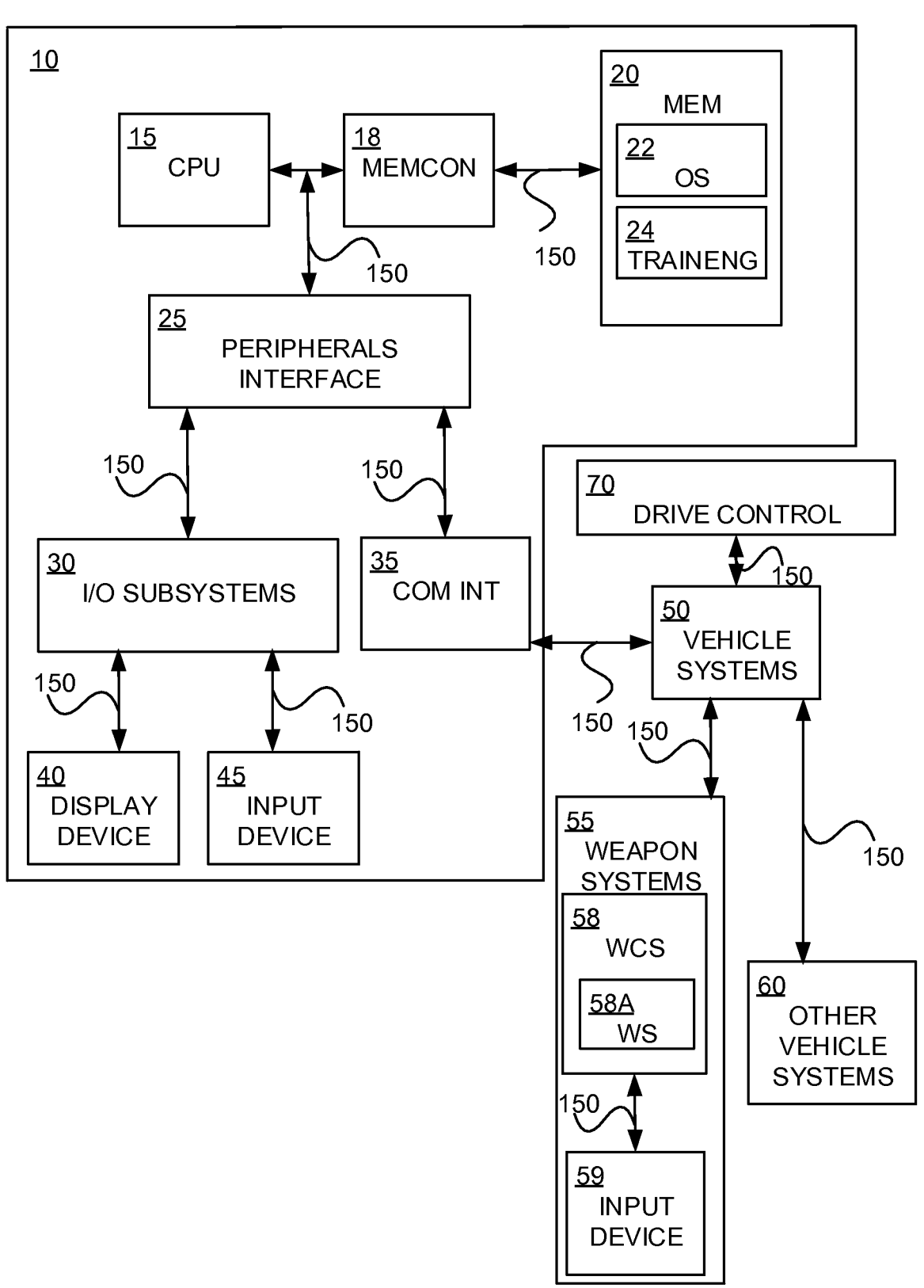
FIG. 1A schematically illustrates a block diagram of an electronic device used for embedded target tracking training according to an embodiment.
Figure 1B:
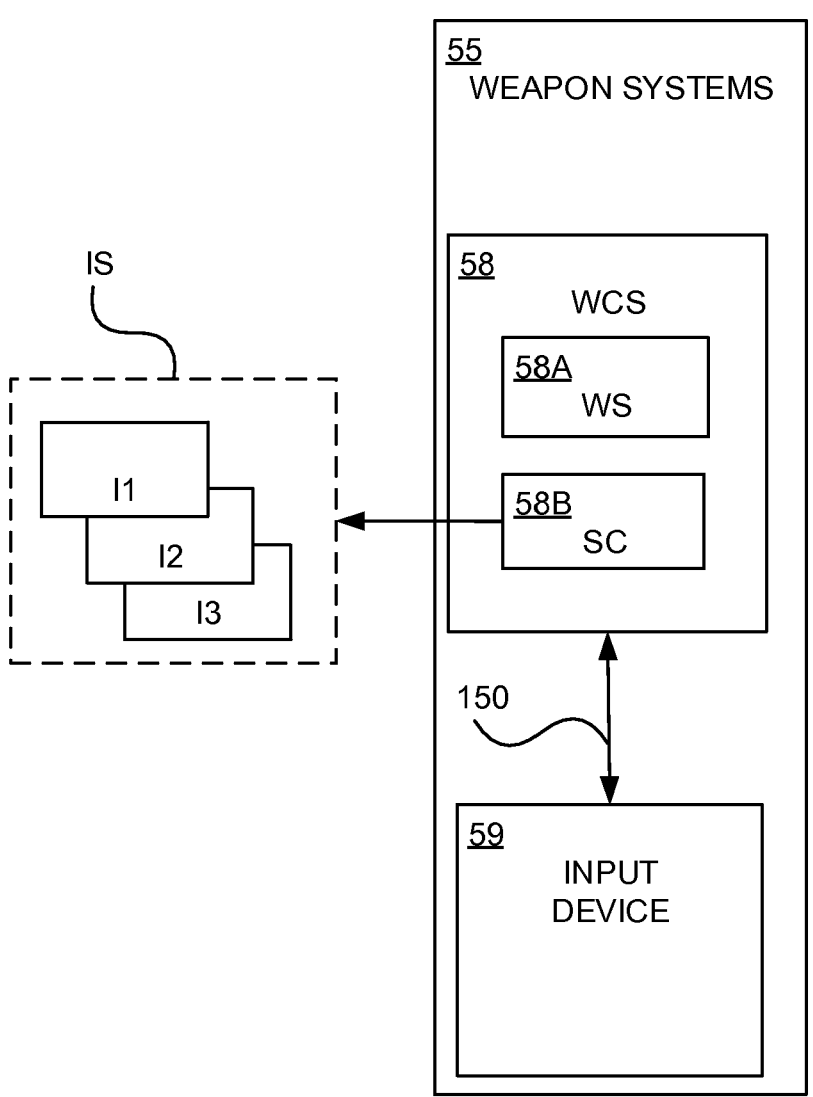
FIG. 1B schematically illustrates a block diagram of weapon systems coupled to the electronic device in FIG. 1A according to an embodiment.

Below FIG. 1A provide a description of an exemplary electronic device for performing the techniques for embedded target tracking training. FIG. 1B illustrates weapon systems associated with the electronic device in FIG. 1A. FIGS. 2A-2C illustrates an exemplary combat vehicle into which the electronic device can be embedded so as to provide the embedded target tracking training. FIGS. 3A-3D illustrates exemplary user interfaces displayed on a display device of an electronic device for providing the embedded target tracking training and FIGS. 4A-4B are a flow diagrams illustrating methods for providing the embedded target tracking training.

FIG. 1A is a block diagram schematically illustrating an electronic device 10, used to provide embedded target tracking training as described in more detail with respect to FIGS. 3A-3D and 4A-4B, according to embodiments. FIG. 1B illustrates weapon systems associated to the electronic device illustrated in FIG. 1A, particularly exemplifying obtaining an image sequence.

The electronic device is arranged to be embedded into a combat vehicle, such as the combat vehicle illustrated in more detail with respect to FIGS. 2A-2C. The electronic device can be embedded into the combat vehicle by means of being provided within (e.g., mounted within an interior compartment) the combat vehicle. Furthermore, the electronic device is configured to be coupled to an interface of one or more vehicle systems of the combat vehicle, such as a vehicle systems 50 including one or more weapon systems 55 and associated weapon control systems (WCS) 58, including one or more sensors 58A, 58B and respective input means 59 to provide one or more control signals for control of the weapon system (e.g., enabling an operator such as a gunner to control the weapon).

According to an embodiment the electronic device 10 can also be coupled to other vehicle systems 60, such as a drive control system 70 and sensor systems. This allows the electronic device to receive data from the vehicle systems such as data associated with sensor data of the vehicle systems and data associated with user inputs provided to the vehicle systems. The sensor data can include data representative of a pointing direction of a weapon system of the vehicle and/or one or more user inputs in the form of control signals provided by a user such a crew member (e.g., gunner) controlling the pointing direction of the weapon system (e.g., main gun of the combat vehicle).

According to an embodiment control signals provided by an operator of the combat vehicle) inputted via the input device 59 (e.g., by the gunner of the combat vehicle using an aiming handle or weapon system control handle) of the weapon system 55 is received at the electronic device but are blocked from being transmitted to the weapon control system 58 for causing actual movement of the weapon system including turret movements. In this embodiment the control signals are used by the electronic device to allow determination of a pointing direction of the weapon system as described in more detail below. A respective operator of the combat vehicle may override the blocking functionality anytime such as by means of a physical switch or button provided at the electronic device or at the weapon control system. This, allows performing training while the weapon system remains stationary but while the movements of the weapon system as controlled by the operator of the weapon system is reflected by means of being determined by the electronic device (e.g., determined and displayed during training by means of an training engine module being stored on the memory of the electronic device). Enabling training while the weapon system remains stationary makes training more easy in terms of satisfying safety requirements for personnel and equipment being in the vicinity of the combat vehicle.

The electronic device comprises one or more communication interfaces, such as a communication interface, 35 for allowing coupling the electronic device to said vehicle systems. The one or more communication interfaces, such as one or more communication interface comprising one or more communication ports, may for example provide one or more interfaces for coupling of a communication line or buss 150 such as a CAN-bus of the vehicle systems to the electronic device via a peripherals interface 25. Communication interface 35 may further comprise an Ethernet-bus for communication of video and/or information signals such as to allow the electronic device to obtain video signals, such as raw video signals from one or more camera devices (e.g., a sight camera of a respective weapon system).

According to an embodiment, communication interface 35 can comprise an external port (not shown) for downloading of data of the electronic device (e.g., data stored on the memory) to a device external of the combat vehicle for example to allow evaluating or monitoring training externally of the vehicle.

The electronic device 10 also includes power system (not shown) for powering the various components of the electronic device.

The electronic device further comprises one or more processors 15, such as one or more central processing units CPUs or field programmable gate arrays FPGAs or other suitable processing means and one or more memory 20 (which optionally includes one or more computer-readable storage mediums). The one or more processors are coupled to the memory via a memory controller 18 so as to allow performing read and write operations.

The electronic device comprises a peripherals interface 25 used to couple input and output peripherals of the electronic device to the processor 15 and memory 20. The one or more processors 15 run or execute various software programs and/or sets of instructions stored in memory 20 to perform various functions for device 100 and to process data so as to enable provision of the embedded target tracking training. In some embodiments, peripherals interface 25, processor 15, and memory controller 18 are, optionally, implemented on a single chip. In some other embodiments, they are, optionally, implemented on separate chips.

The electronic device comprises I/O subsystems 30 coupling input/output peripherals, via respective controllers of the I/O subsystems (not shown), to the electronic device. The input/output peripherals includes a display device 40 and one or more input devices 45.

These components optionally communicate over one or more communication buses or signal lines 150.

The memory stores software components including an operating system 22 and one or more programs including an training engine module 24. The operating system includes various software components and/or drivers for controlling and managing general system tasks (e.g., memory management, storage device control, power management, etc.) and facilitates communication between various hardware and software components.

The one or more input devices 45 may be a keyboard, touch screen, mouse, buttons or other suitable input means allowing an operator to control various settings of the training engine module 24. The various settings of the training engine module 24 can also be controlled via buttons or a display such as displayed buttons or hardware buttons associated with display 40. Optionally, according to an embodiment the inputs allowing to control the various settings may be provided from an operator using the input device 59 of the weapon control system. According to this embodiment the input device 59 can replace the input device 45 such that the input device 45 of the electronic device is not needed. The settings can relate to initiation (e.g., invoking) of the training engine module, starting/ending training, configuring a user interface, such as the user interface illustrated in FIGS. 3A-3D provided by the training engine module and displayed by the display device. Configuration can also relate to configuration of one or more virtual targets and selection of or configuration of a simulated environment displayed on the display device. The settings according to a preferred embodiment also include one or more training difficulty settings affecting one or more settings associated with one or more virtual targets. The difficulty settings are described in more detail below.

According to an embodiment, the training engine module 24 and its associated functionalities and including any additional modules is configured integrated on an electronic device already existing in the combat vehicle, such as integrated in an electronic device as described above but where the electronic devices is part of or constituting the weapon control system of the combat vehicle. In this embodiment, the training engine can receive information from the input device 45 or the input device 59 of the weapon control system, for example the training engine can receive information from the input device 59 directly without the use of the above described communication interface 35. This also allows for a configuration wherein training functionality can be configured to be built in the weapon system (e.g., weapon control system) to provide training functionality as a complement to traditional functionalities of the weapon control system. This allows performing embedded crew training and in particular embedded gunnery training using an existing combat vehicle without adding or modifying hardware of an already existing combat vehicle since the training functionality can be configured solely based on adding and/or modifying already existing software of the combat vehicle such as software associated with the weapon system. Thus, the embedded training can provide realistic gunnery training during operation of the combat vehicle (e.g., while the combat vehicle is operated such as physically driven in a physical environment with respective crew members positioned at their respective stations). This allows gunnery training under the influence of actual vehicle dynamics (e.g., dynamics exhibited when traversing different types of ground conditions such as rough terrain, slopes and slippery ground) and actual environmental conditions (e.g., different visibility conditions such as day, night, fog, sun glare, snow, rain, dense forest).

The training engine module 24 can be a single software program or application or may optionally be distributed over a plurality of software modules, stored on the memory, each with different functionalities. Functionalities included in the training engine module includes functionality for determination of a pointing direction of a weapon system of the combat vehicle based on data received from the vehicle systems (e.g., weapon systems 55 including weapon control systems 58 and an input device of the weapon systems). This functionality also determines an aim point location for the weapon system based on the pointing direction of the weapon. The aim point location of the weapon system can be determined by the training engine module based on one or more user inputs representative of one or more control signals causing movement of the pointing direction of the weapon system along an azimuth and/or an elevation direction. The one or more user inputs are provided by the operator of the weapon system using the input device 59 (e.g., a weapon system control handle, such as an aiming handle) wherein the one or more inputs once provided are transmitted to the electronic device 10 via a communication interface such as via communication interface 35 described above. To determine a current pointing direction the training engine module can also perform a determination of the pointing direction of the weapon system based on one or more previous user inputs such as the last received user input.

The aim point location thus determines based on said pointing direction where an aim, such as the aim of an electronic sight (e.g., sight camera) or an electronic target seeker of the weapon system is to be placed in and relative to an environment (e.g., a simulated environment as described in more detail below) observed through the target seeker so as to enable that the weapon system when fired will hit a position in the environment onto which the aim is positioned.

This functionality for determining a pointing direction of the weapon system including the aim point location of the weapon system can also optionally include receiving information indicative of the pointing direction of the weapon system from a sensor 58A of the weapon control system. This, sensor 58A may for example sense an attitude of the combat vehicle onto which the weapon system is mounted and sense a current pointing direction of the weapon system compared to a reference pointing direction of the weapon system, wherein the reference pointing direction can be when the weapon system (e.g., a gun barrel of the weapon system) is aligned with (e.g., running parallel with) a vehicle body of the combat vehicle, such as the vehicle body VB1 illustrated in FIGS. 2A-2C, and aligned with (e.g., running parallel with) a forwards direction of the combat vehicle, wherein the forwards direction corresponds to a direction in which the combat vehicle is or will be driven forwards. Thus, this reference position can be said to correspond to wherein the pointing direction of the weapon system is positioned with 0 degrees off-set along an azimuth and 0 degrees off-set along an elevation, as illustrated with reference to FIGS. 2A-2C. Alternatively, the sensor 58A can sense the attitude of the combat vehicle and the relative positioning of the pointing direction of the weapon system relative to the combat vehicle can be determined from other information such as information indicating positioning of means of one or more actuators configured to control the pointing direction of the weapon system as described in more detail with reference to FIG. 2A. For sensing of the attitude of the vehicle an inertial measurement unit IMU can be used such as an inertial measurement unit including a set of accelerometers.

With reference to FIG. 1B, the one or more sensors 58A, 58B of the weapon systems 55, as illustrated in FIG. 1A, further comprises at least one image sensor 58B, wherein said at least one image sensor 58B is at least one sight camera associated with said weapon system 55. According to an aspect of the present disclosure, said image sensor 58B is a sight camera associated with a main gun of a combat vehicle, e.g. a combat vehicle 800 according to FIG. 2A. Said at least one image sensor 58B is arranged to obtain an image sequence IS (e.g., a video sequence) comprising a plurality of images I1, I2, I3. Furthermore said at least one image sensor 58B, e.g. sight camera, is arranged in connection to a respective weapon system, such as in connection to a main gun of said combat vehicle. The sight camera is arranged to obtain a video sequence IS representative of a target area for a respective weapon system (e.g., a main gun such as a cannon) of the combat vehicle, wherein the target area represents a section of the environment around the combat vehicle as determined from the pointing direction of the sight camera and the field of view of the sight camera. The sight camera comprises one or more cameras such as a video camera and/or a thermal imager (e.g., infrared camera) and may further include or be coupled to one or more additional sensors such as a laser range finder for determining range to a target observed through the sight camera. The sight camera 58B is arranged to transmit the obtained image sequence to the electronic device 10 for display on the display device 40. For this purpose the sight camera 58B can be coupled to a video network such as an Ethernet network or bus (e.g., communication interface 35 and peripherals interface 25 of the electronic device 10 illustrated in FIG. 1A).

Figure 3A:
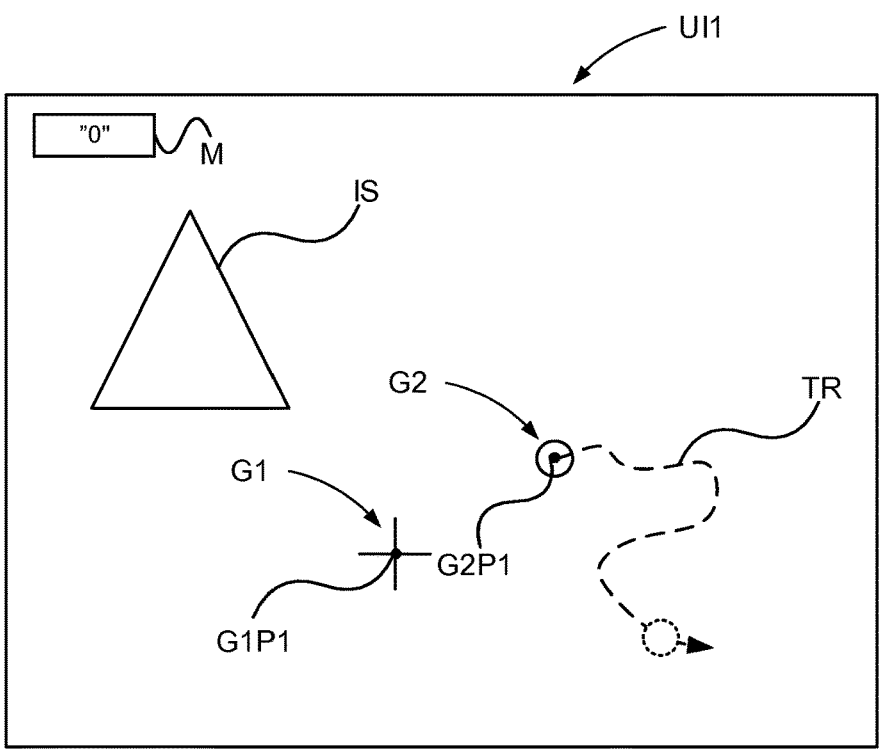
FIG. 3A schematically illustrates a user interface displayed on a display device of the electronic device, illustrated in FIG. 1A, in accordance with an embodiment.
Figure 3B:
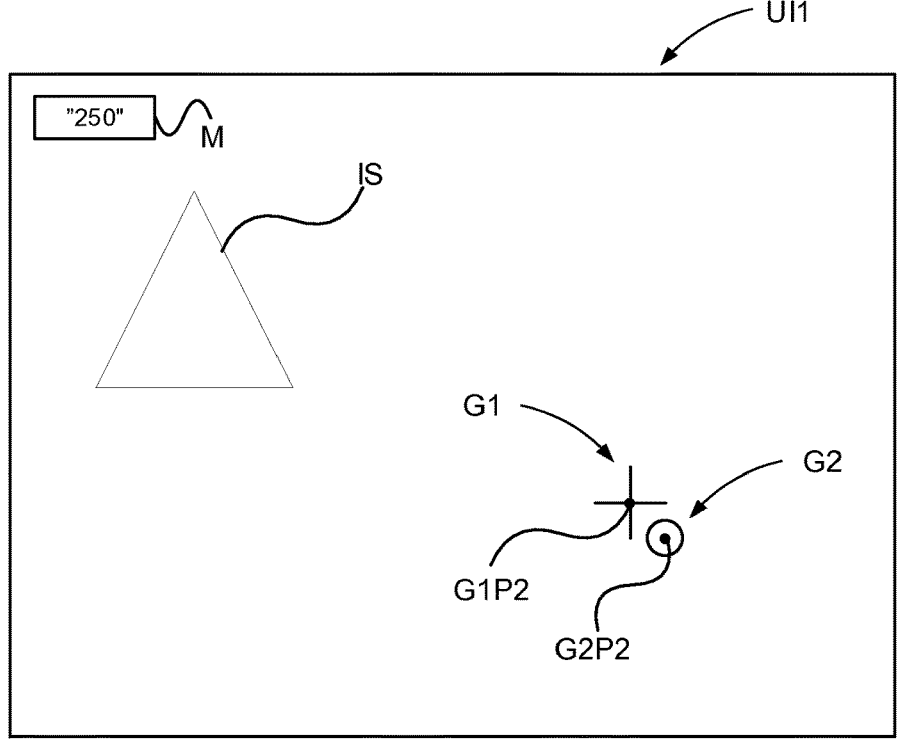
FIG. 3B schematically illustrates a user interface displayed on a display device of the electronic device, illustrated in FIG. 1A, in accordance with an embodiment.
Figure 3C:
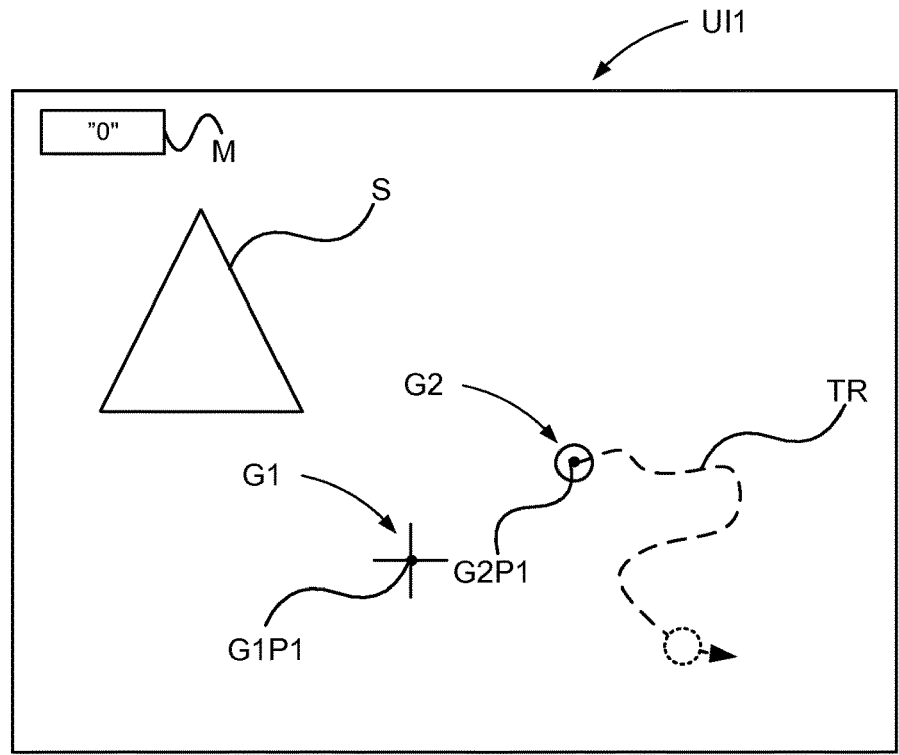
FIG. 3C schematically illustrates a user interface displayed on a display device of the electronic device, illustrated in FIG. 1A, in accordance with an embodiment.
Figure 4A:
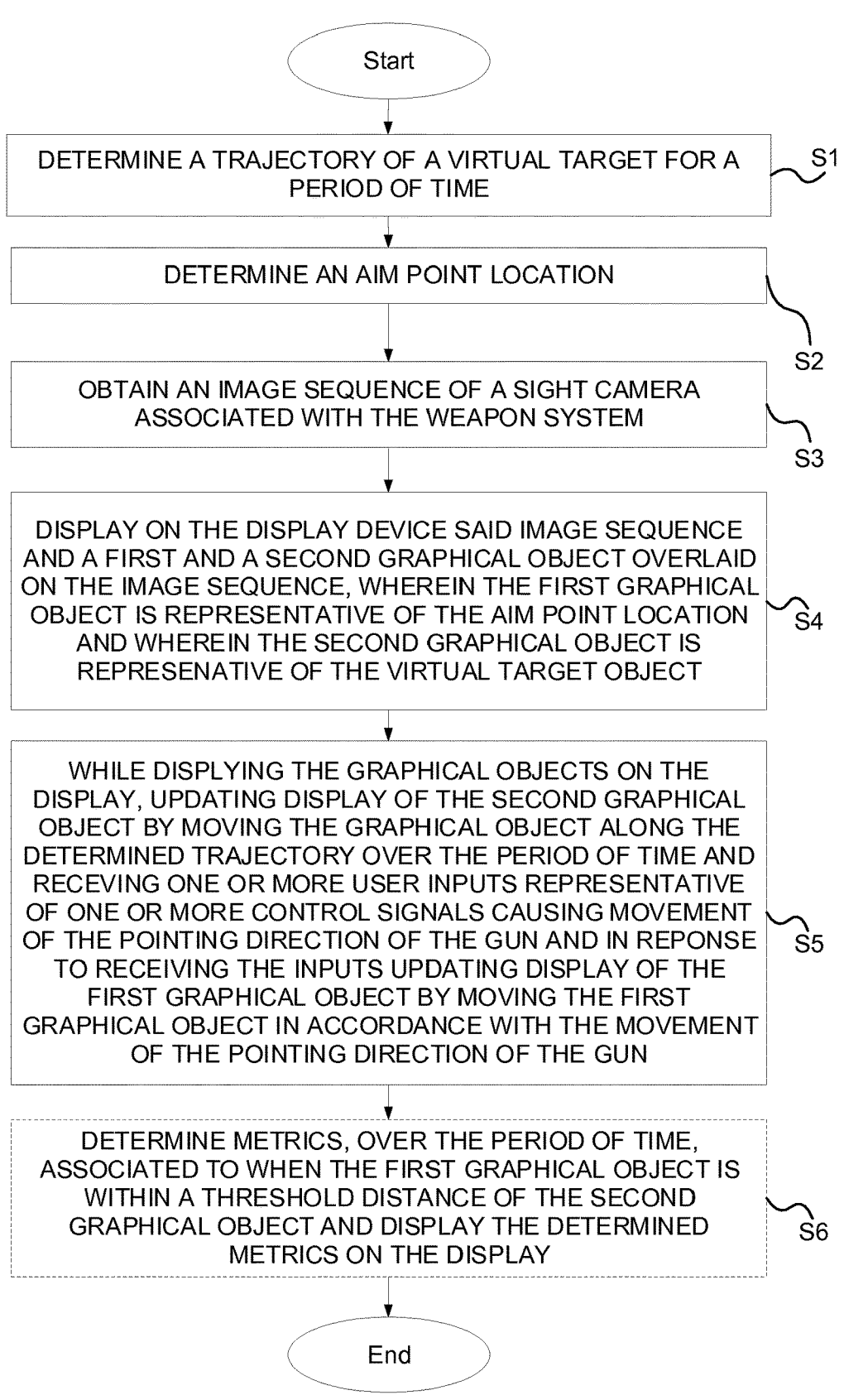
FIG. 4A schematically illustrates a flow diagram of a method for embedded target tracking training according to an embodiment.
Figure 4B:
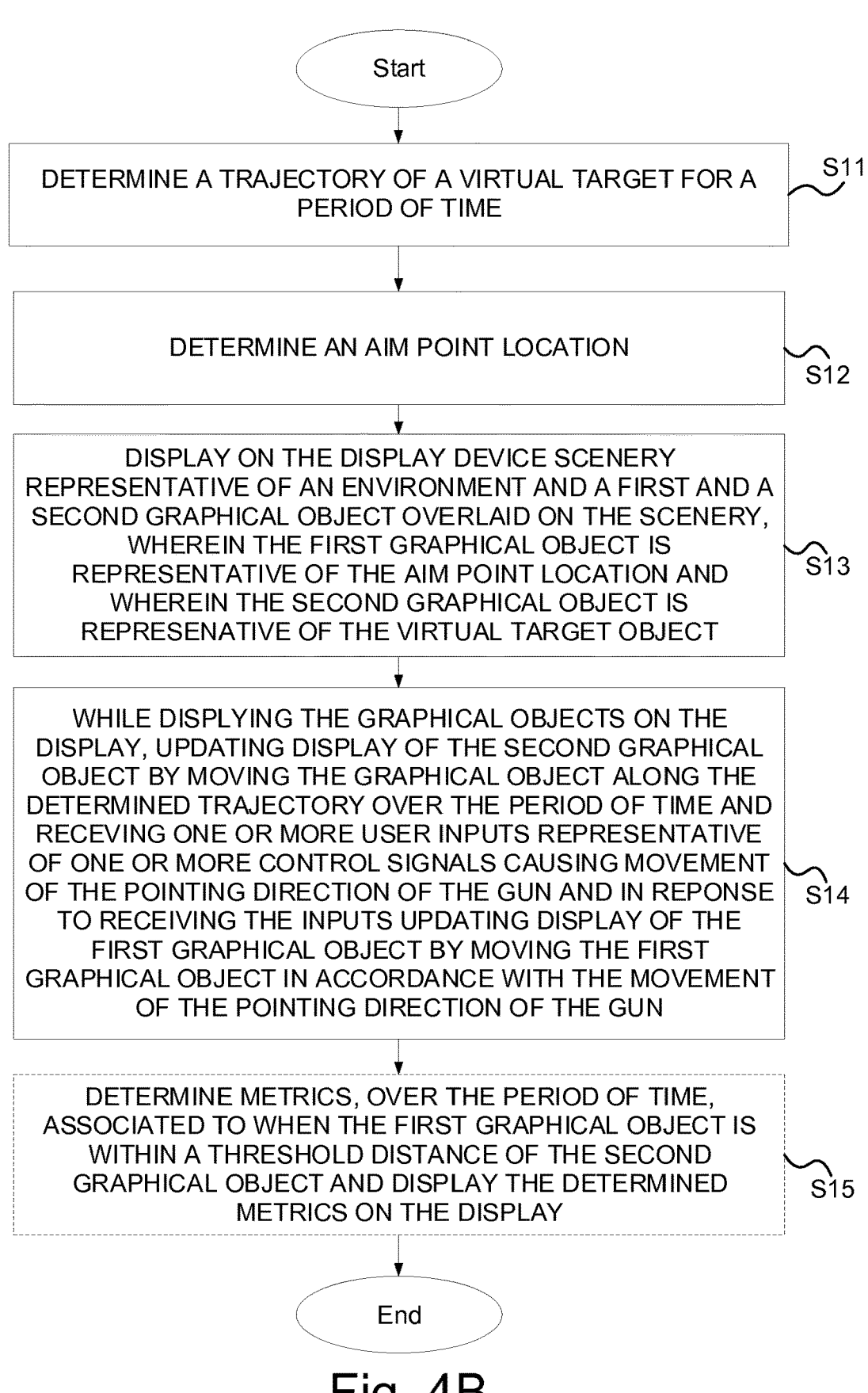
FIG. 4B schematically illustrates a flow diagram of a method for embedded target tracking training according to an embodiment.

The functionalities of the training engine module 24 also includes a target trajectory determination allowing determination of one or more trajectories of a virtual target, such as a trajectory TR illustrated in FIG. 3A and FIG. 3C. The target trajectory can be determined based one or more dynamical models (parametric model representing movement of one or more types of target) of one or more actual targets with user adjustable parameters (adjustable via input device 45). The adjustable parameters can be path or route, speed, manoeuvrability and/or a time period for how long the trajectory shall be. One or more of these adjustable parameters can also be linked to the previously described one or more configurable training difficulty settings. For example the one or more training difficulty settings can include training difficulty levels 1-5 wherein difficulty increases with increasing difficulty level. Thus, configuring the training engine by setting difficulty level 1 will make it relatively easy for an operator of the weapon system to track a respective virtual target presented during performing of the training while setting difficulty level to level 5 will make it relatively difficult for the operator of the weapon system to track the target. The training difficulty settings (e.g., levels) can be used to adjust more than one parameter at the time with one single input. For example each setting (level) can be associated with a certain speed or speed range according to which the virtual target will move when performing training in addition each setting can be associated with one or more predefined appearances such as shape, size and/or display contrast of the virtual target as presented during training.

Optionally the trajectories may be determined by means of user a selecting (via using input device 45) a target trajectory of a set of pre-stored target trajectories stored on the memory. Optionally a user can select to use the dynamic target model or one or more of the pre-stored target trajectories. Pre-stored target trajectories can also include fixed position target. The target trajectories can be defined in a three-dimensional space. Optionally, the target trajectories can be defined in a two-dimensional space.

The functionalities of the training engine module 24 also includes target tracking accuracy determination. This functionality determines time based metrics associated to when the aim point location, by means of operator inputs, is within a threshold distance from the virtual target as it follows the target trajectory. This is described in more detail with reference to FIGS. 3A-3D. This functionality also includes scoring functionality provided based on the metrics so as to present a target tracking accuracy score to an operator of the weapon system.

The functionalities of the training engine module 24 also includes display control logics, such as a rendering engine, allowing the training engine module 24 to generate (e.g., generate and display) a user interface of the display device 40 of the electronic device 10. According to an embodiment, associated with FIGS. 3A-3B and 4A, the training engine module 24 is arranged to display one or more graphical objects, described in more detail with reference to FIGS. 3A-3B, overlaid onto the image sequence IS obtained by the sight camera 58B. Thus, according to this embodiment the display device 40 can be an already existing display configured for use by a gunner for aiming of a respective weapon system but where the displayed image sequence IS is modified by the training engine to also include the one or more overlaid graphical objects (e.g., one or more virtual targets). According to another embodiment, associated with FIGS. 3C-3D and 4B, the training engine module 24 generates a simulated environment (e.g., scenery S as illustrated in FIGS. 3C-3D) for display in a user interface of the display device 40 together with the one or more overlaid graphical objects (e.g., one or more virtual targets or one or more virtual targets and a hair cross for representing a current aim point of a respective weapon system) as described in more detail with reference to FIGS. 3C-3D.

Figure 3D:
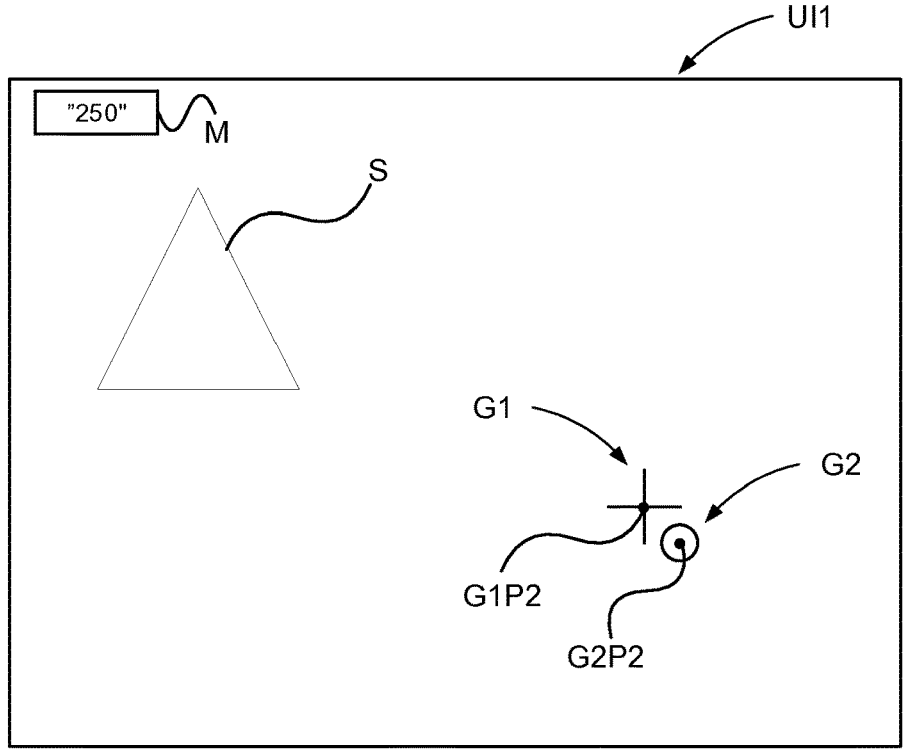
FIG. 3D schematically illustrates a user interface displayed on a display device of the electronic device, illustrated in FIG. 1A, in accordance with an embodiment.

Thus, according to the embodiment, associated with FIGS. 3C-3D and 4B the functions of the training engine module 24 also includes environment simulation, for example provided by a simulation engine of the training engine module. According to an aspect of this embodiment the simulated environment generated by the environment simulation functionality of the training engine module is a two-dimensional environment. According to another aspect of this embodiment the simulated environment generated by the environment simulation functionality of the training engine module is a three-dimensional environment. This enables the training engine module to generate a simulated environment representative of an environment around the combat vehicle. The simulation engine includes configurable parameters allowing a user (via the input device 45) to configure the generated simulated environment for example with respect to weather conditions and day or night conditions (affecting visibility within the environment), terrain types, season (e.g., winter or summer etc.). To support generation of the simulated environment terrain data (such as a terrain database) and texture data may be stored on the memory. Additionally, a set of graphical objects are stored on the memory allowing a user to define user interface objects (e.g., allowing to define appearance of graphical objects presented within a user interface displayed on the display device, such as the user interface described with references to FIGS. 3C-3D). Configurable appearance can relate to how the virtual targets are visualized by the rendering functionality in the user interface. For example different types of targets may be configured to have different appearance in terms of shape, size and display contrast. It is to be noted that the simulation engine can be configured as a separate software module stored on the memory For the embodiment associated with FIGS. 3C-3D and 4B the rendering functionality, for example provided by a rendering engine, is arranged for allowing the training engine module to display a representation of at least a portion of the generated simulated environment in a user interface of the display device. This functionality also includes displaying of graphical objects overlaid onto the simulated environment, such as a first and second graphical object described in more detail with reference to FIGS. 3C-3D. It is to be noted that the rendering engine can be configured as a separate software module stored on the memory. Also, the rendering engine can also be configured with a dedicated hardware such as one or more graphic processing units and/or display control components.

By means of the input device 45, according to the embodiment associated with FIGS. 3C-3D and 4B, the user can define a simulation start position (e.g., a simulation start location such as a ground plane position) of the simulated environment. This position (e.g., the simulation start location) define where in the simulated environment the combat vehicle is intended to be positioned when starting the training (e.g., upon initiation of the training). The position also includes additional information defining a start direction of the combat vehicle within the simulated environment. Also, the direction can be configured by means of the input device 45 or by means of input device 59. Thus, the start position including the direction of the vehicle at the start position is used determine which portion of the environment that is to be rendered on the display device, i.e. presented within the user interface.

To determine which portion of the simulated environment to render onto the display device the rendering functionality can use the information associated with simulated start position including the information associated with the start direction. Thus, based on this information the function can determine an observation point, of the combat vehicle, within the simulated environment defining which portion, i.e. which section of scenery, of the environment to render onto the display.

Thus, the rendering functionality can display, on the display device, a first section of the simulated environment based on the simulation start point and the simulation start direction of the combat vehicle.

The rendering functionality also determines at least one or more second sections of the simulated environment and causes rendering thereof, i.e. updates display of displayed section of the scenery of the simulated environment. To determine the at least one or more second sections of the simulated environment the functionality uses information associated the simulation start point and the simulation start direction of the combat vehicle together with one or more control signals and/or sensor data representative of the pointing direction of the weapon system. Optionally, this determination can further be based on control signals representative of control signals intended for causing movement of the combat vehicle inputted via the drive control system 70. This, allows shifting the observation point in terms of which portion or section of the simulated environment that is currently seen from the combat vehicle in accordance with movements of the combat vehicle (e.g., actual or simulated vehicle movement).

Optionally this section, e.g., the first or the at least one or more second sections of the simulated environment can be rendered based on simulating a field of view FOV of an optical instrument being part of the weapon control system of the combat vehicle, wherein the optical instrument can be an image target seeker (e.g., video camera based target seeker or infrared target seeker). For this purpose one of more camera transforms can be used so as to display a field of view of the environment as seen through the optical instrument. Also, the relative positioning of this optical instrument at the combat vehicle can be taken into account for the simulation of the section of the environment as seen through the field of view of the optical instrument.

According to an embodiment the function for determining the target trajectory also interfaces with the function for determining the simulated environment so as to provide the target trajectory within the simulated environment. This allows to configure parameters of the target trajectory associated to defining a location inside the simulated environment from where the trajectory starts.

According to an embodiment coupled to where the weapon system is kept stationary while performing training as described above, the functionality of the training engine further includes weapon system inertia determination. This allows to accurately simulate the pointing direction of the weapon system by determining how the weapon system will move as a result of operator inputs under the influence of inertia. To provide this determination the training engine module can be provided with one or more models, stored in the memory, such as one or more dynamical models representative of how the weapon system moves as a result of operators inputs under the influence of inertia. This functionality is disabled when the training engine module and/or the weapon system as described above is configured to allow actual movements of the weapon system.

FIG. 2A illustrates a perspective view of an exemplary combat vehicle 800 in which an electronic device, such as the electronic device 10 illustrated in FIG. 1A can be embedded, as illustrated an described in more detail with reference to FIG. 2C, to provide embedded combat vehicle gun target tracking training. The combat vehicle 800 comprises at least one integrated weapon system TG (e.g., combat vehicle gun such as a main gun). The combat vehicle can be a combat vehicle such as an armoured vehicle, a tank, or an infantry fighting vehicle. The combat vehicle, illustrated in FIG. 2A, comprises a vehicle body VB1, a turret T1 and a turret mounted canon TG with a gun barrel B1. The vehicle body VB1 may comprise a chassis mounted via one or more suspension mechanisms (not shown) to ground engaging means (not shown) such as endless tracks or wheels driven by one or more engines (not shown). The operator (e.g., gunner) of the integrated weapon system, such as the main gun of the combat vehicle, can, by using a control system of the weapon system, control a pointing direction PD of the gun barrel so as to aim the gun onto a target. In addition, to and input device, such as the input device 59 illustrated with reference the FIG. 1A, the weapon control system, such as the weapon control system illustrated with reference to FIG. 1A also includes at least one actuator (not shown), such as at least one electro-hydraulic actuator for causing movement of the pointing direction of the weapon system (e.g., gun barrel) along an azimuth direction and/or along an elevation direction, as described in more detail with reference to FIGS. 2B-2C, Thus, by providing one or more control signals (e.g., one or more control signals provided by an operator using input device 59) to the weapon control system generate one or more control commands based on the received control signals, wherein the control commands are transmitted to the one or more actuators for causing the one or more actuators to move the pointing direction PD of the weapon system (e.g., gun barrel) in accordance with the one or more control signals provided by an operator of the weapon system.

FIG. 2B schematically illustrates a top view of the exemplary combat vehicle illustrated in FIG. 2A. As can be seen in FIG. 2B the weapon system, in this case the main gun of the combat vehicle, is positioned in an azimuth pointing direction PD1 which in the illustrated example extends along the main direction extension of the combat vehicle. To control the azimuth pointing direction of the weapon (e.g., gun barrel B1) the crew member can provide one or more control signals, via the input device 59 illustrated in FIG. 1A, causing movement (i.e., rotation) of the weapon along the azimuth direction AZ. For the illustrated weapon system wherein the weapon system is configured as integrated in the turret, this also causes rotation of the turret.

FIG. 2C schematically illustrates a side view of the exemplary combat vehicle illustrated in FIG. 2A wherein the electronic device 10, as illustrated in FIG. 1A, is embedded in the vehicle and coupled to the vehicle systems 50.

As illustrated in FIG. 2C the weapon system can in addition to be controlled along the azimuth direction AZ, as illustrated in FIG. 2B, also be controlled to move along an elevation direction EL causing movement of the elevation pointing direction PD2 of the weapon system (e.g., gun barrel B1). To control the elevation pointing direction of the weapon (e.g., gun barrel B1) the crew member can provide one or more control signals, via the input device 59 illustrated in FIG. 1A, causing inclining movement of the weapon along the azimuth direction EL. In FIG. 2C the weapon system can be seen inclined slight upwards relative to a ground plane (not shown but running parallel with an upper and/or lower surface of the vehicle body VB1) supporting the combat vehicle.

The azimuth pointing direction PD1 and the elevation pointing direction jointly constitutes the pointing direction PD as illustrated in FIG. 2A.

FIG. 3A schematically illustrates an exemplary user interface displayed on a display device of the electronic device, illustrated in FIG. 1A, in accordance with an embodiment.

In more detail, FIG. 3A illustrates an exemplary user interface UI1 displayed by the electronic device, illustrated in FIG. 1A, on the display device for the purpose of enabling embedded target tracking training performed at the combat vehicle.

The electronic device 10, as illustrated in FIG. 1A, obtains an image sequence IS of a sight camera 58B associated with the weapon system of the combat vehicle and causes display of a user interface UI1 on a display device, such as a display device 40 of the electronic device 10 as illustrated in FIG. 1A. The display device can be a display device already existing in a combat vehicle, such as in the combat vehicle 800, for example a display associated with a gunner station and/or a weapon system, such as one or more respective weapons of the weapon system 55 of the combat vehicle 800.

Thus, the user interface UI1 includes, i.e. displays, said image sequence IS, i.e. the image sequence IS provided by at least one image sensor being comprised by at least one sight camera associated with the weapon system, e.g. a sight camera associated with a main gun of the combat vehicle, as described with reference to FIG. 1B. For illustrational purpose the image sequence IS has been illustrated as a single triangle however the image sequence IS may represent any image sequence of a sight camera such as an image sequence containing a mountain or other type of environmental object as captured within the field of view of the sight camera. It is to be noted that the image sequence can be displayed on a larger portion of the user interface than in the illustrated example, such as covering the entire part of the user interface.

The user interface further includes a first graphical object G1 overlaid onto the image sequence IS, wherein the first graphical object is representative of the aim point location as determined from the pointing direction of the weapon system as described in more detail with reference to FIG. 1A. Thus, the user interface UI1 of FIGS. 3A-3B displayed on the display including the image sequence IS and the first graphical object G1 can constitute a sight display already existing in a combat vehicle as configured for use by a vehicle gunner.

In addition, the user interface further includes a second graphical object G2, overlaid onto the image sequence IS, wherein the second graphical object is representative of a virtual target travelling along a trajectory TR over a period of time as determined by the electronic device, as described in more detail with reference to FIG. 1A.

In addition, the user interface further optionally includes a graphical object M, such as a data field, enabling display of metrics including target tracking accuracy. The graphical object M enabling display of metrics including target tracking accuracy is described in more detail with reference to FIG. 3D.

The user interface or the electronic device or one or more input device associated thereto also include a button or other suitable functionality for initiating target tracking training, including initiating of displaying the virtual target. Optionally the user interface, once invoked or displayed, displays both image sequence IS and the first graphical object and a button or other suitable input functionality is included in the user interface or in the electronic device for causing introduction (e.g., display) of the virtual target, i.e., to enable to control when the virtual target shall be displayed and subsequently move along the determined trajectory. The position of the virtual target which the target assumes when starting training (e.g., when invoking the training engine module or when causing introduction/display, of the virtual target) is also referred to as a starting position of the virtual target. This position correspond to the first position of the determined trajectory. Optionally, this starting position correspond to a position along the determined trajectory which the virtual target is currently positioned at when causing introduction/display, of the virtual target. For example the user can invoke the training engine module to cause the user interface UI1 to display the first graphical object and trigger movement of the virtual target along the determined trajectory without displaying the virtual target and then subsequently trigger display of the virtual target a point in time after the trigger of the movement whereby the virtual target, as represented by the second graphical object, will be displayed at a position along the determined trajectory corresponding to where the virtual target has moved and is presently positioned at the point in time as determined by the speed and the determined trajectory.

As can be seen in FIG. 3A the first graphical object is positioned at a first location G1P1 in the user interface, i.e. at a location on the display device. This location corresponds to the aim point location of the weapon system as determined from a current pointing direction PD of the weapon system. Also, the second graphical object, representative of a virtual target, is displayed positioned at a second location G2P1 in the user interface. The virtual target is configured to follow a target trajectory TR over a period of time as determined by the electronic device. Thus, the user (e.g., gunner of the combat vehicle) can now train target tracking by means of providing inputs (e.g., one or more control signals), via, the input device 59 of the weapon system causing movement of the pointing direction of the weapon system and thereby also the aim point location as reflected by the first graphical object. The goal being to track the virtual target as it moves over time as closely as possible with the aim point location of the weapon system as reflected by the first graphical object. Thus, while the graphical objects are displayed the display device updates the position of the respective first and second graphical objects, as displayed in the user interface, based on information received and processed at the electronic device provided. The information is the determined trajectory for the virtual target and the pointing direction of the weapon system.

According to an embodiment, the first graphical object G1 is displayed as a cross-hair and the second graphical object G2 is displayed as a circle or sphere. According to an alternative embodiment the second graphical object G2 is displayed as a graphical object having characteristics resembling an actual target (e.g., shape/outline and/color can be adapted to resemble a live target such as a tank). Further according to this embodiment a size of the second graphical object can be adapted based on the determined trajectory for the virtual target and a current position of the combat vehicle relative to a current position of the virtual target travelling along the determined trajectory.

FIG. 3B schematically illustrates an exemplary user interface displayed on a display device of the electronic device, illustrated in FIG. 1A, in accordance with an embodiment of the present invention.

In FIG. 3B, illustrating the user interface as shown in FIG. 3A at a later point in time, it can be seen that display of the first and the second graphical objects have been updated as a result from the virtual target moving along the determined target trajectory and based on movements of the pointing direction of the weapon system as control by an operator of the weapon system (e.g., combat vehicle gunner). As, illustrated in FIG. 3B the first graphical object G1 is updated to be displayed at a third position G1P2 different from the first position and the second graphical object G2 has been updated to be displayed at a fourth position G2P2 different than the second position. It is to be noted that the first and the second graphical objects can be updated to assume multiple intermediate positions as compared to the positions illustrated in the exemplary user interfaces of FIGS. 3A and 3B such as illustrated by a dotted line indicating the virtual target trajectory ranging from location or position G2P1 to G2P2.

FIG. 3C schematically illustrates an exemplary user interface displayed on a display device of the electronic device, illustrated in FIG. 1A, in accordance with an embodiment.

This embodiment differs from the embodiment of associated with FIGS. 3A-3B in that the image sequence IS of the sight camera as displayed in the display 40 associated to the electronic device 10, as illustrated in FIG. 1A, is replaced by a simulated environment (e.g., scenery S as described below).

In more detail, FIG. 3C illustrates an exemplary user interface UI1 displayed by the electronic device, illustrated in FIG. 1A, on the display device for the purpose of enabling embedded target tracking training. The display device can be a display device already existing in a combat vehicle, such as in the combat vehicle 800, for example a display associated with a gunner station and/or a weapon system, such as one or more respective weapons of the weapon system 55 of the combat vehicle 800.

The user interface includes, i.e. displays, scenery S representative of a section of an environment, i.e. the simulated environment provided by the electronic device as described with reference to FIG. 1A. For illustrational purpose the scenery has been illustrated as a single triangle which may represent a mountain or other type of environmental object. It is to be noted that the scenery can be displayed on a larger portion of the user interface than in the illustrated example, such as covering the entire part of the user interface.

The user interface further includes a first graphical object G1 overlaid onto the scenery, wherein the first graphical object is representative of the aim point location as determined from the pointing direction of the weapon system as described in more detail with reference to FIG. 1A.

The user interface further includes a second graphical object G2, overlaid onto the scenery, wherein the second graphical object is representative of a virtual target travelling along a trajectory TR over a period of time as determined by the electronic device, as described in more detail with reference to FIG. 1A.

Thus, the user interface of FIGS. 3C-3D is similar to the user interface of FIGS. 3A-3B in terms of including the respective first and second graphical objects but differs in that the graphical objects are overlaid onto a simulated environment instead of an image sequence of a sight camera.

The user interface further optionally includes a graphical object M, such as a data field, enabling display of metrics including target tracking accuracy.

The user interface or the electronic device also include a button or other suitable functionality for initiating target tracking training, including initiating of displaying the virtual target. Optionally the user interface, once invoked or displayed, displays both scenery and the first graphical object and a button or other suitable input functionality is included in the user interface or in the electronic device for causing introduction (e.g., display) of the virtual target, i.e., to enable to control when the virtual target shall be displayed and subsequently move along the determined trajectory. The position of the virtual target which the target assumes when starting training (e.g., when invoking the training engine module or when causing introduction/display, of the virtual target) is also referred to as a starting position of the virtual target. This position correspond to the first position of the determined trajectory. Optionally, this starting position correspond to a position along the determined trajectory which the virtual target is currently positioned at when causing introduction/display, of the virtual target. For example the user can invoke the training engine module to cause the user interface UI1 to display the first graphical object and trigger movement of the virtual target along the determined trajectory without displaying the virtual target and then subsequently trigger display of the virtual target a point in time after the trigger of the movement whereby the virtual target, as represented by the second graphical object, will be displayed at a position along the determined trajectory corresponding to where the virtual target has moved and is presently positioned at the point in time as determined by the speed and the determined trajectory.

As can be seen in FIG. 3C the first graphical object is positioned at a first location G1P1 in the user interface, i.e. at a location on the display device. This location corresponds to the aim point location of the weapon system as determined from a current pointing direction PD of the weapon system. Also, the second graphical object, representative of a virtual target, is displayed positioned at a second location G2P1 in the user interface. The virtual target is configured to follow a target trajectory TR over a period of time as determined by the electronic device. Thus, the user (e.g., gunner of the combat vehicle) can now train target tracking by means of providing inputs (e.g., one or more control signals), via, the input device 59 of the weapon system causing movement of the pointing direction of the weapon system and thereby also the aim point location as reflected by the first graphical object. The goal being to track the virtual target as it moves over time as closely as possible with the aim point location of the weapon system as reflected by the first graphical object. Thus, while the graphical objects are displayed the display device updates the position of the respective first and second graphical objects, as displayed in the user interface, based on information received and processed at the electronic device provided. The information is the determined trajectory for the virtual target and the pointing direction of the weapon system.

According to an embodiment, the first graphical object is displayed as a cross-hair and the second graphical object is displayed as a circle or sphere. According to an alternative embodiment the second graphical object G2 is displayed as a graphical object having characteristics resembling an actual target (e.g., shape/outline and/or color can be adapted to resemble a live target such as a tank). Further according to this embodiment a size of the second graphical object can be adapted based on the determined trajectory for the virtual target and a current position of the combat vehicle relative to a current position of the virtual target travelling along the determined trajectory.

FIG. 3D schematically illustrates an exemplary user interface displayed on a display device of the electronic device, illustrated in FIG. 1A, in accordance with an embodiment of the present invention.

In FIG. 3D, illustrating the user interface as shown in FIG. 3C at a later point in time, it can be seen that display of the first and the second graphical objects have been updated as a result from the virtual target moving along the determined target trajectory and based on movements of the pointing direction of the weapon system as control by an operator of the weapon system (e.g., combat vehicle gunner). As, illustrated in FIG. 3D the first graphical object is updated to be displayed at a third position G1P2 different from the first position and the second graphical object has been updated to be displayed at a fourth position G2P2 different than the second position. It is to be noted that the first and the second graphical objects can be updated to assume multiple intermediate positions as compared to the positions illustrated in the exemplary user interfaces of FIGS. 3C and 3D such as illustrated by a dotted line indicating the virtual target trajectory ranging from location or position G2P1 to G2P2.

Furthermore, the metrics field M displays a target tracking accuracy score of 250 points. This score, i.e. target tracking accuracy score is based on metrics associated to when the first graphical object is within a threshold distance of the second graphical object so as to enable to evaluate target tracking accuracy. Thus, the score reflects how accurate evaluated over a period of time the operator (e.g., gunner) tracks the target by means of the aim point location. Accordingly, as long as the first graphical object, indicating where the operator aims the weapon system, is sufficiently close to the second graphical object (e.g., within a threshold distance from the second graphical object) the target tracking accuracy score increases and while the first graphical object is too far from the second graphical object (e.g., outside of the threshold distance) there is no increase of the tracking accuracy score. The target tracking accuracy score may be generated by an analytics module (not shown) of the training engine module 24 as illustrated in FIG. 1A, wherein the analytics module is arranged to compare the distance between the respective first and second graphical objects over a period of time, such as a period of time for when the virtual target is displayed. The analytics module may also determine a metric associated with initial aiming accuracy performance associated with the time it takes for the gunner to aim the weapon system within a threshold distance from the virtual target based on determining the time it takes from the initial appearance of the virtual target in the display until the aim point is within the threshold distance (e.g., by counting time from initial appearance of the second graphical object until the first graphical object is within said threshold distance). In addition, the analytics module may be arrange to store individual target tracking accuracy scores for one or more different individuals (e.g., gunners performing training). The analytics module may then rank the scores and display the currently highest stored score in the data field represented by the graphical object M in conjunction with the current score of the gunner currently performing training.

FIG. 4A schematically illustrates a flow diagram of a method at a combat vehicle for embedded combat vehicle weapon system target tracking training performed at the electronic device of FIG. 1A according to an embodiment of the present invention. The method for embedded combat vehicle weapon system target tracking training is configured to performed at a combat vehicle, e.g. the combat vehicle 800 as described in FIG. 2A. The method for embedded combat vehicle weapon system target tracking training is configured to performed at a combat vehicle, see FIG. 2A, at the electronic device of the combat vehicle, see FIG. 1A, wherein said electronic device comprises a display device and input means.

At block S1 a trajectory of a virtual target is determined. In more detail, a trajectory over a period of time is determined at the electronic device by execution of the training engine as described in more detail with reference to FIG. 1A. In more detail, a trajectory of a virtual target for a period of time is determined at the electronic device with a display device and input means as described in more detail with reference to FIG. 1A. The trajectory of the virtual target may for example be determined by the training engine module 24 as illustrated in FIG. 1A.

At block S2 an aim point location is determined. In more detail, the aim point is determined based on a current pointing direction of the weapon system along an azimuth and an elevation direction, as described in more detail with reference to FIGS. 1A-1B and FIGS. 2A-2B. In more detail, the aim point of the weapon system of the combat vehicle is determined based on a current pointing direction of the weapon system along an azimuth and an elevation direction as directed via operator inputs, as described in more detail with reference to FIGS. 1A-1B and FIGS. 2A-2B.

At block S3, an image sequence, such as an image sequence IS, of a sight camera associated with the weapon system of the combat vehicle is obtained.

At block S4, said image sequence IS is displayed on the display device. Also at block S4 a first graphical object, is displayed on the display device, overlaid on the image sequence, wherein the first graphical object is representative of the aim point location and displayed on a first position on the display device to indicate the determined aim point location of the weapon system. Furthermore, at block S4 a second graphical object is displayed on the display device, overlaid on the image sequence, wherein the second graphical object is representative of the virtual target and displayed on a second position on the display device to indicate a starting position of the virtual target based on the determined trajectory over the period of time;

At block S5, while the graphical objects are displayed, display of the second graphical object is updated by moving the second graphical object from the second position along the determined trajectory over the period of time. Furthermore, at block S5 one or more user inputs, provided via input means, are received, the one or more user inputs representative of one or more control signals causing movement of the pointing direction of the weapon system along the azimuth and/or the elevation direction is received and in response to receiving the one or more user inputs display of the first graphical object is updated by moving the first graphical object from the first position in accordance with the movement of the pointing direction of the weapon system caused by the one or more user inputs.

At block S6, which is optionally performed, metrics over the period of time is determined, wherein the metrics are associated to when (e.g., for how long over the period of time) the first graphical object, described with reference to FIGS. 3A-3B, is within a threshold distance to the second graphical object, described with reference to FIGS. 3A-3B.

For example, the threshold distance can be determined as a threshold from a centre point of the second graphical object.

FIG. 4B schematically illustrates a flow diagram of a method for embedded combat vehicle weapon system target tracking training performed at the electronic device of FIG. 1A according to an embodiment of the present invention.

The method of FIG. 4B differs from the method of FIG. 4A in that the image sequence IS displayed according to the method of FIG. 4A is replaced, in the method of FIG. 4B, by a simulated environment (e.g., scenery S).

At block S11 a trajectory of a virtual target is determined. In more detail, a trajectory over a period of time is determined at the electronic device by execution of the training engine as described in more detail with reference to FIG. 1A.

At block S12 an aim point location is determined. In more detail, the aim point is determined based on a current pointing direction of the weapon system along an azimuth and an elevation direction, as described in more detail with reference to FIG. 1A and FIGS. 2A-2B.

At block S13, scenery representative of a first section of an environment is displayed on the display. Also at block S13 a first graphical object, is displayed on the display device, overlaid on the scenery, wherein the first graphical object is representative of the aim point location and displayed on a first position on the display device to indicate the determined aim point location of the weapon system. Furthermore, at block S13 a second graphical object is displayed on the display device, overlaid on the scenery, wherein the second graphical object is representative of the virtual target and displayed on a second position on the display device to indicate a starting position of the virtual target based on the determined trajectory over the period of time;

At block S14, while the graphical objects are displayed, display of the second graphical object is updated by moving the second graphical object from the second position along the determined trajectory over the period of time. Furthermore, at block S14 one or more user inputs, provided via input means, are received, the one or more user inputs representative of one or more control signals causing movement of the pointing direction of the weapon system along the azimuth and/or the elevation direction is received and in response to receiving the one or more user inputs display of the first graphical object is updated by moving the first graphical object from the first position in accordance with the movement of the pointing direction of the weapon system caused by the one or more user inputs.

At block S15, which is optionally performed, metrics over the period of time is determined, wherein the metrics are associated to when (e.g., for how long over the period of time) the first graphical object, described with reference to FIGS. 3C-3D, is within a threshold distance to the second graphical object, described with reference to FIGS. 3C-3D. For example, the threshold distance can be determined as a threshold from a centre point of the second graphical object.

According to yet another embodiment the methods of FIGS. 4A and/or 4B are performed at a turret of a combat vehicle, such as a combat vehicle 800 illustrated in FIG. 2A. According to this embodiment the electronic device 10 as illustrated in FIG. 1A is integrated into the turret and the turret is stripped from the combat vehicle.

Below some aspects of a method for embedded combat vehicle weapon system target tracking training, computer readable storage medium, and electronic device, according to the present disclosure are listed. Said aspects may refer to FIG. 1A, FIG. 3C-3D and FIG. 4B.

Aspect 1. A method for embedded combat vehicle weapon system target tracking training, the method comprising:

at an electronic device 10 with a display device 40 and input means 45; 59:

determining S11 a trajectory TR of a virtual target for a period of time;

determining S12 an aim point location of the weapon system 55 based on a current pointing direction PD of the weapon system along an azimuth AZ and an elevation EL direction;

displaying S13, on the display device:

scenery S representative of a first section of an environment;

a first graphical object G1, overlaid on the scenery, wherein the first graphical object is representative of the aim point location and displayed on a first position G1P1 on the display device to indicate the determined aim point location of the weapon system; and a second graphical object G2, overlaid on the scenery, wherein the second graphical object is representative of the virtual target and displayed on a second position G2P1 on the display device to indicate a starting position of the virtual target based on the determined trajectory over the period of time;

while displaying S14 the graphical objects on the display device:

updating display of the second graphical object by moving the second graphical object from the second position along the determined trajectory over the period of time; and receiving, via the input means, one or more user inputs representative of one or more control signals causing movement of the pointing direction of the weapon system along the azimuth and/or the elevation direction;

in response to receiving the one or more user inputs, updating display of the first graphical object by moving the first graphical object from the first position in accordance with the movement of the pointing direction of the weapon system caused by the one or more user inputs.

Aspect 2. The method of aspect 1, further wherein:

while the graphical objects are displayed:

determining S15, over the period of time, metrics associated to when the first graphical object is within a threshold distance of the second graphical object so as to enable to evaluate target tracking accuracy.

Aspect 3. The method of any of aspects 1-2, wherein the first graphical object is displayed as a cross-hair.

Aspect 4. The method of any of aspects 1-3, wherein the second graphical object is displayed as a spherical object.

Aspect 5. The method of any of aspects 1-2, wherein the second graphical object is displayed as a shape indicating a type of virtual target.

Aspect 6. The method of any of the preceding aspects, wherein information indicative of the pointing direction of the weapon system is received from a user input device 59 associated with the weapon system.

Aspect 7. The method of any of aspects 1-6, wherein the environment is a simulated environment provided by the electronic device.

Aspect 8. The method of any of the preceding aspects, further wherein:

while the graphical objects are displayed:

updating display of the scenery S to represent at least a second section of the environment, wherein the updating of the scenery is based on receiving one or more control signals causing movement of the pointing direction of the weapon system along the azimuth and/or the elevation direction.

Aspect 9. The method of any of the preceding aspects, wherein updating display of the scenery is based on receiving one or more control signals representative of causing movement of the combat vehicle, wherein the one or more control signals representative of causing movement of the combat vehicle are received from a drive control system 70.

Aspect 10. The method of aspect 2, wherein a target tracking accuracy score is determined based on the determined metrics and wherein the target tracking accuracy score is displayed on the display device.

Aspect 11. A computer readable storage medium storing one or more programs, the one or more programs comprising instructions, which when executed by an electronic device 10 with a display 40 and input means 45; 59 cause the device to perform any the method of any of aspects 1-10.

Aspect 12. An electronic device 10, comprising:

one or more processors 15;

a display device 40;

input means 45; 59; and memory 20 storing one or more programs configured to be executed by the one or more processors, the one or more programs including instructions for performing the method of any of aspects 1-10.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A method at a combat vehicle for embedded combat vehicle weapon system target tracking training performed at the combat vehicle, the method comprising:

at an electronic device embedded within the combat vehicle and electrically coupled to a communication bus of the combat vehicle, the electronic device comprising a processor and a display device arranged within the combat vehicle, the electronic device configured to receive sensor data from a weapon control system via the communication bus:

determining, by the processor, a trajectory of a virtual target for a period of time;

determining, by the processor, an aim point location of the weapon system of the combat vehicle based on a current pointing direction of the weapon system along an azimuth and an elevation direction, wherein the current pointing direction is determined from the sensor data received from the weapon control system;

obtaining an image sequence of a sight camera associated with the weapon system of the combat vehicle via the communication bus:

displaying, on the display device:

said image sequence;

a first graphical object, overlaid on the image sequence, wherein the first graphical object is representative of the aim point location and displayed on a first position on the display device to indicate the determined aim point location of the weapon system; and a second graphical object, overlaid on the image sequence, wherein the second graphical object is representative of the virtual target and displayed on a second position on the display device to indicate a starting position of the virtual target based on the determined trajectory over the period of time;

while displaying the graphical objects on the display device:

updating display of the second graphical object by moving the second graphical object from the second position along the determined trajectory over the period of time; and receiving one or more user inputs from an aiming handle of the weapon control system, the one or more user inputs representative of one or more control signals causing movement of the pointing direction of the weapon system along the azimuth and/or the elevation direction;

in response to receiving the one or more user inputs, updating display of the first graphical object by moving the first graphical object from the first position in accordance with the movement of the pointing direction of the weapon system caused by the one or more user inputs.

2. The method of claim 1, further wherein:

while the graphical objects are displayed:

determining, over the period of time, metrics associated to when the first graphical object is within a threshold distance of the second graphical object so as to enable to evaluate target tracking accuracy.

3. The method of claim 2, wherein a target tracking accuracy score is determined based on the determined metrics and wherein the target tracking accuracy score is displayed on the display device.

4. The method of claim 1, wherein the first graphical object is displayed as a cross-hair.

5. The method of claim 1, wherein the second graphical object is displayed as a spherical object.

6. The method of claim 1, wherein the second graphical object is displayed as a shape indicating a type of virtual target.

7. The method of claim 1, wherein information indicative of the pointing direction of the weapon system is received from a user input device associated with the weapon system.

8. The method of claim 1, wherein the image sequence of the sight camera associated with the weapon system is replaced by scenery representative of a simulated environment provided by the electronic device.

9. The method according to claim 8, further wherein:

while the graphical objects are displayed:

updating display of the scenery to represent at least a second section of the simulated environment, wherein the updating of the scenery is based on receiving one or more control signals causing movement of the pointing direction of the weapon system along the azimuth and/or the elevation direction.

10. The method according to claim 8, wherein updating display of the scenery is based on receiving one or more control signals representative of causing movement of the combat vehicle, wherein the one or more control signals representative of causing movement of the combat vehicle are received from a drive control system.

11. A non-transitory computer readable storage medium storing one or more programs, the one or more programs comprising instructions, which when executed by an electronic device with a display arranged in a combat vehicle cause the device to perform the method of claim 1.

12. An electronic device embedded within a combat vehicle and electrically coupled to a communication bus of the combat vehicle, the electronic device comprising:

one or more processors and a display device arranged within the combat vehicle, the electronic device configured to receive sensor data from a weapons control system via the communication bus; and memory storing one or more programs configured to be executed by the one or more processors, the one or more programs including instructions for performing a method comprising:

determining, by the one or more processors, a trajectory of a virtual target for a period of time;

determining, by the one or more processors, an aim point location of the weapon system of the combat vehicle based on a current pointing direction of the weapon system along an azimuth and an elevation direction, wherein the current pointing direction is determined from the sensor data received from the weapon control system;

obtaining an image sequence of a sight camera associated with the weapon system of the combat vehicle via the communication bus:

displaying, on the display device:

said image sequence;

a first graphical object, overlaid on the image sequence, wherein the first graphical object is representative of the aim point location and displayed on a first position on the display device to indicate the determined aim point location of the weapon system; and a second graphical object, overlaid on the image sequence, wherein the second graphical object is representative of the virtual target and displayed on a second position on the display device to indicate a starting position of the virtual target based on the determined trajectory over the period of time;

while displaying the graphical objects on the display device:

updating display of the second graphical object by moving the second graphical object from the second position along the determined trajectory over the period of time; and receiving one or more user inputs from an aiming handle of the weapon control system, the one or more user inputs representative of one or more control signals causing movement of the pointing direction of the weapon system along the azimuth and/or the elevation direction;

in response to receiving the one or more user inputs, updating display of the first graphical object by moving the first graphical object from the first position in accordance with the movement of the pointing direction of the weapon system caused by the one or more user inputs.

* * * * *